United States Patent [19]
Dorchester et al.

[11] Patent Number: 5,866,054
[45] Date of Patent: Feb. 2, 1999

[54] COMPOSITION AND METHOD FOR EXTRUDING PLASTIC ARTICLES HAVING ACCENT COLOR PATTERN

[75] Inventors: John J. Dorchester, Mansfield; Bobby D. Smith, Arlington, both of Tex.; Ronald M. Harris, Alpharetta, Ga.

[73] Assignee: M. A. HannaColor, a division of M. A. Hanna Company, Suwanee, Ga.

[21] Appl. No.: 965,271

[22] Filed: Nov. 6, 1997

Related U.S. Application Data

[62] Division of Ser. No. 625,694, Apr. 3, 1996.
[51] Int. Cl.⁶ ............................ B29C 47/04; B29C 47/06
[52] U.S. Cl. ........................ 264/75; 264/173.18; 264/245
[58] Field of Search ............................. 264/73, 74, 75, 264/76, 210.1, 245, 173.17, 173.18

[56] References Cited

U.S. PATENT DOCUMENTS

| | | |
|---|---|---|
| 2,803,041 | 8/1957 | Hill et al. . |
| 4,649,008 | 3/1987 | Johnstone et al. . |
| 4,810,733 | 3/1989 | Sakuma et al. . |
| 5,053,444 | 10/1991 | Trotoir . |
| 5,387,381 | 2/1995 | Saloom . |

OTHER PUBLICATIONS

"PMI copolymer: HDT modifier for ABS", Hidetaka Yatagai, Nippon Shokubai America, New York, N.Y., Jul./Aug. 1993 Plastics Compounding, pp. 42–43.

*Primary Examiner*—Mathieu D. Vargot
*Attorney, Agent, or Firm*—Jones, Day, Reavis & Pogue

[57] ABSTRACT

A new and useful a plastic article, particularly plastic siding, with an accent color pattern incorporated therein, a specially formed accent color pellet which is useful in manufacturing such an article, and a process for producing the article using the pellets are provided. The process contemplates extruding a plastic product from a base material formed of powder-sized particles and specially formed accent color pellets. The accent color pellets are alloyed masses of resins and pigment which are larger than the powder particles of the base material, and have a higher vicat softening point temperature than the base material. The alloyed pellets are designed to melt controllably and to mix controllably with the base material. During the extrusion process, the accent color pellets begin to soften and disperse later than the base material, and cause controllable dispersion of the accent color into the base material, thereby producing accent color streaks in the resulting product having controllable characteristics. The process is particularly suited for producing a simulated wood-grain or streaking effect in plastic siding, and as described can produce hard streaking, soft streaking, and a mottled or variegated streaking in which more than one accent color is used simultaneously. A novel formulation for the accent color pellets is disclosed, in which poly-α-methylstyrene is used as the only high vicat softening temperature resin.

20 Claims, 8 Drawing Sheets

Prior Art

Prior Art

Prior Art

COMPOSITION AND METHOD FOR EXTRUDING PLASTIC ARTICLES HAVING ACCENT COLOR PATTERN

This is a divisional of copending application Ser. No. 08/625,694 filed Apr. 3, 1996.

TECHNICAL FIELD

The present invention relates to a plastic article with an accent color pattern incorporated therein, to an accent color pellet which can be used to import the accent color pattern to the plastic article, and to a method of using the accent color pellet in the manufacture of the plastic article. The present invention relates particularly to an extrudable plastic article, such as vinyl siding, with a simulated wood-grain or multicolored appearance, and to a specially formed accent color pellet which is particularly useful in extruding such a plastic article and to a method for using the specially formed accent color pellet to manufacture the plastic article.

BACKGROUND OF THE INVENTION

For a number of years, manufacturers have attempted to produce plastic articles, such as vinyl siding, with simulated wood-grain or multicolored appearance. Various methods of forming such plastic articles have been used, but none has succeeded in achieving a realistic wood-grain appearance in which the wood-grain is strongly accented against the background. One known process for forming vinyl siding having some wood-grain appearance is shown in U.S. Pat. No. 4,048,101, to Nakamachi. The disclosure of U.S. Pat. No. 4,048,101 is hereby incorporated by reference. Nakamachi discloses a process for producing a synthetic plastic wood product with a multi-color appearance by forming colored particles of a first styrene resin with additives including a foaming agent, a foaming control agent, an inert inorganic foam nucleating material, and a dry colorant, and blending these colored particles with colored pellets of a second styrene resin having a lower melt flow index than the first resin. Nakamachi's blended resins are then coextruded at which time the foaming agent increases the volume of the blended resins by 10% to 300%, and produces an annular ring pattern. U.S. Pat. No. 5,387,781, to Saloom (the "Saloom patent") also discloses a method for imparting a wood-grain appearance by coextrusion of a capstock including accent color pellets consisting essentially of acrylics and/or polycarbonates with a polyvinylchloride ("PVC") substrate. The disclosure of U.S. Pat. No. 5,387,781 is hereby incorporated by reference. Saloom's lone example and only disclosed high deflection or softening point temperature acrylic resin, KMAX T-260, is no longer commercially available due to environmental concerns of its manufacturer. No polycarbonates and no other known mixture of acrylics has been found to yield even the marginal wood-grain effect achieved by KMAX T-260. Moreover, the method disclosed in Saloom results in somewhat unpredictable results because of the difficulty in simultaneously controlling the melt flow index and deflection or softening point temperature of KMAX T-260. KMAX T-260 is a resin having a high deflection or vicat softening point temperature, and a low melt flow index. The Saloom method does not result in bold, contrasting or "hard" streaking. Thus, there remains a need in the industry for a method of making simulated wood-grain plastic siding that gives predictable, controllable results in a pre-selected array of colors and boldness of streaking, in which the siding panels display a realistic wood-grain appearance, strongly accented against the background.

SUMMARY OF THE PRESENT INVENTION

The present invention provides a method for producing a new and useful plastic article, particularly vinyl siding, with a selectable and controllable accent color pattern incorporated therein. The present invention further includes a specially formed accent color pellet which provides a substantial increase in wood-grain appearance and allows a new controllability in the process. The present invention further provides a plastic article which is preferably comprised of a stock or substrate producing material, covered with a layer known as a "capstock," which displays a realistic wood-grain appearance, in which the simulated wood-grain is strongly accented against the background. Typically, the substrate and the capstock are coextruded, but the substrate may be manufactured in a first step, followed by a coating step in which the capstock is extruded onto the substrate.

The present invention provides a capstock extruded from a base material comprising generally powder-sized particles and specially formed, substantially larger accent color pellets, which provide both an increase in wood-grain appearance and a new level of control to the user. The base material is a powdered blend of a PVC material, titanium dioxide ($TiO_2$), minor amounts of acrylic impact modifier, stabilizer, wax and small amounts of pigment, and/or conventional color concentrate. The accent color pellets are larger than the generally powder-size particles of the capstock base material and have a higher vicat softening point temperature than the base material. Both of these properties contribute to the delayed softening which permits color accentuation. The accent color pellets contain a large proportion of pigment to provide the accent color. Typically, pigments in the accent color pellets are selected to contrast to some degree with the surrounding or background color of the capstock base material or sometimes the substrate material of the panel. The accent color may be lighter or darker than the surrounding background.

The only previously known acrylic resin used in forming accent color pellets, KMAX T-260, has been taken off the market for environmental concerns raised by its production. No suitable substitute, either alone or in a mixture, has until now been available. The present invention provides a substitute that is superior to any previously known material due to the newly discovered controllability of the degree of intermixing and blending of the accent color streaks into the capstock base material. IMAX T-260 was the only high deflection point/high vicat softening point temperature material disclosed as an example in the Saloom patent. Like many other acrylics, it has a low melt flow index.

The accent color pellets of the present invention include blends of acrylic resins having a low vicat softening point temperature and a low melt flow index with poly-α-methylstyrene resin ("PMS") as the only high vicat softening point temperature resin. Unlike acrylics or polycarbonates, PMS has a high melt flow index. In addition to the low vicat low melt flow acrylics, and the high vicat high melt flow PMS, acrylics having low vicat and high melt flow may also be used. The blends of polymer resins also comprises the resinous binders for the pigment in these pellets. The PMS provides unexpected results when used with these acrylics in accent color pellets, compared to the previously known acrylic-only materials. The results obtained using PMS in combination with low deflection or softening point temperature resins are unexpectedly better than those obtained using KMAX T-260 to manufacture accent color pellets, which allow for color blending control and versatility not available before the present invention.

The superiority of accent color pellets using only PMS as the high softening point material lies primarily in the controllability of blending of the accent colors into the base material and the resultant effect on the final product, and results to a large degree from the high melt flow index.

The special accent color pellets are alloyed ("fused") pellets comprising principally resin and pigment. The resin is preferably a combination of low vicat softening point temperature acrylic and high vicat softening point temperature PMS resin materials, which are blended with the selected pigments to produce a pellet having a vicat softening point temperature substantially higher than the vicat softening point temperature of the capstock base material. Preferably, the pellets are designed such that the vicat softening point temperature of the pellets is in the range from about 15° C. to about 50° C. higher than the vicat softening point temperature of the base material. More preferably the vicat softening point temperature of the pellets is in the range from about 20° C. to about 40° C. higher than the vicat softening point temperature of the base material. Additionally, the pellets preferably have a much lower surface area per unit weight than the base material. For these reasons, when introduced with the base material into an extruder, the pellets soften and disperse later than the base material, and allow only restricted dispersion of the accent color into the extrudate, thereby producing the desired accent color pattern in the extrudate. By using PMS, a wider range of dispersion of the accent color into the base material can be controllably attained. The process is particularly suited for producing a simulated wood-grain or streaking effect in vinyl siding.

Vinyl siding panels are typically produced by a coextrusion process in which a 5–10 mil thick layer of a capstock is coextruded with or onto a vinyl substrate layer that is simultaneously produced by a second, larger extruder. The total composition is about 35–40 mils thick. In the prior art, the base material for the capstock is usually PVC, acrylonitrile-styrene-acrylic, acrylonitrile-styrene-EPDM, or a blend of these resins. Accent color pellets, such as those described above are fed into the capstock extruder at such a rate to provide the desired streaks. Typically, this rate is in the range of 1–10% of the total weight of the capstock layer into which the granules are incorporated, but may be higher. Other colorants may be fed into the base material for the capstock at lower rates and typically comprise up to about 10% of the total color in the final siding panel. These quantities, of course, may be modified in order to provide a strongly colored background with contrasting white or lighter color streaks formed by the accent color pellets, or to provide a light colored background with contrasting darker streaks of any color. The pellets can be continuously introduced into the extruder, or they can be introduced into the extruder in an intermittent, pulsed fashion.

It has been common in the industry to add pigments to the base material to supply the "background" color for the capstock. With the present invention, this addition is not necessary. By adjusting the proportion of PMS in the accent color pellets, a controlled quantity of the pigment can be dispersed into the base material. A lower proportion of PMS allows more dispersion, resulting in streaks having edges which are of controllably variable definition. A higher proportion of PMS yields less dispersion of the accent color into the base material, resulting in hard or robust streaks of accent color with a more sharply defined edge.

For a given proportion of PMS in the accent color pellets, the streak definition can also be controlled by adjusting the extruder barrel and screw temperatures. Reducing the temperature results in more well defined streaks. The precise temperatures depend on the shear provided by the extruder and will vary from one extrusion line to another.

With the present invention, it is also possible to use two or more different colors of accent color pellets simultaneously and to separately control the dispersion of each into the base material to produce a selected variegated appearance to the simulated wood-grain plastic siding product. With the new flexibility, the background color can be selected while simultaneously providing, for example, both a controllable degree of variegation and sharply delineated, hard streaks in simultaneously selected and produced colors. Applicants have discovered that with vinyl siding produced by the process of the invention, the accent color patterns or streaks formed in the plastic siding appear to wear better than the capstock base material in the siding. In addition, panels in which the accent color has been allowed to disperse into the base material should wear better than a base material having only hard streaks with no dispersion of accent color, and better than a capstock comprising such non-weatherable resins as ABS.

Further aspects of the present invention will become apparent from the following detailed description and the accompanying drawings.

DETAILED DESCRIPTION OF THE PREFERRED EMBODIMENT

In the manufacture of plastic siding, it is known to coextrude two layers of vinyl through an extrusion die to form an extrudate comprising two layers of plastic bonded together. One layer of the plastic is known as the substrate. The substrate, which is hidden from view when the siding is applied to a building, can be formed of a conventional, relatively inexpensive, but sturdy vinyl (e.g., rigid PVC). The other layer, referred to in the art as "capstock", forms the exposed, outer component of the plastic product. In the present invention, the capstock includes both a base material and special accent color pellets, as discussed further hereinafter. The capstock base material may have the same or a different composition than the substrate. Capstock base material formulas are known to vary widely throughout the industry. Such variation does not affect the scope of the present invention. The special accent color pellets are referred to herein as pellets, and are preferably made in the form of cylindrical pellets, but may have other shapes, such as cubes, spheres, or beads. Preferably the pellets have a relatively small surface area to mass ratio so that heat transfer is slow into the pellets relative to the capstock base material with which the pellets are mixed.

Figure 1:
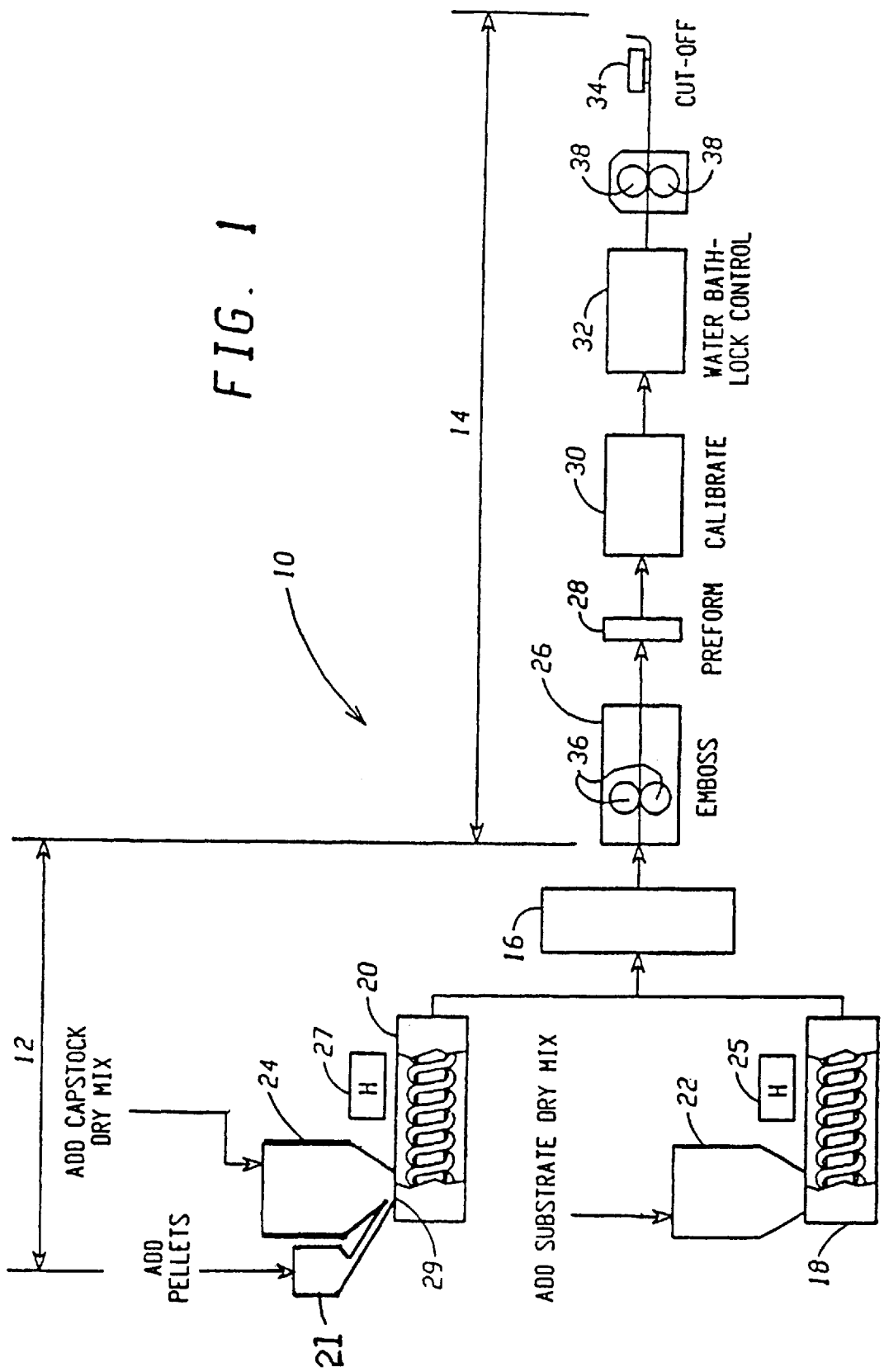
FIG. 1 is a schematic illustration of a system for extruding plastic siding according to the principles of the present invention.

FIG. 1 illustrates a system 10 for producing a plastic siding panel. The system 10 includes an extrusion section 12 in which plastic material is extruded into a flat plastic sheet, and a post-forming section 14 in which the extruded plastic sheet, while in a hot, semi-viscous state, is formed into a siding profile.

In the system of FIG. 1, the capstock base material is formed by a dry mix of powder-sized particles including resin (e.g., PVC), base color pigment material (if added), and conventional additives (e.g., stabilizers). The mixed capstock is held in the feed hopper 24 and is fed into the throat 29 of the extruder 20. The accent color pellets are added directly to the throat 29 of the extruder 20 from a pellet calibrated feeder 21. The accent color pellets become incorporated with the capstock base material in the extruder 20.

The extrusion section 12 includes an extrusion die 16, a pair of screw extruders 18, 20, for feeding material, under predetermined heat and pressure conditions, into the extrusion die 16, and feed chambers 21, 22, and 24, designed to mix and feed material into a respective one of the screw extruders 18, 20. Here, the extruder 18 is designated as the substrate extruder, and the extruder 20 is designated as the capstock extruder.

The combined substrate producing material is held in the feed hopper 22 (along with a conventional color concentrate, if desired), and then introduced into the substrate extruder 18. In the extruder 18, the substrate producing material is heated by heating element(s) 25 to soften and melt the substrate material into a viscous state before it is fed into the extrusion die 16. The special accent color pellets are mixed with the capstock base material in the throat 29 of the capstock extruder 20. A conventional color concentrate can also be added to the capstock in the feed chamber 24, if desired, and introduced with the capstock into the capstock extruder 20. In the capstock extruder 20, the combined capstock base material and accent color pellets are heated by the heating elements 27 to soften the capstock base material into a molten, viscous state before the combined materials are fed into the extrusion die 16. In the capstock extruder, the color accent pellets begin to soften and disperse. The degree of both softening and dispersion controllably depends on the exact formulation used in the alloy of resins and pigments in the pellets. This introduces the accent color streaks or patterns into the viscous molten capstock. The substrate material and the capstock are fed together into the extrusion die 16. In the extrusion die 16, the viscous substrate material and the viscous capstock (including the accent color streaks produced by the pellets) are coextruded to form a sheet of plastic.

In the post-forming section 14, the extruded sheet of plastic, while in a hot semi-viscous state, is formed into a siding configuration. The post-forming section 14 includes an embosser 26, a preform die 28, a calibrator 30, a water bath 32 and a cutoff mechanism 34.

The embosser 26 is located immediately downstream of the extrusion die 16. The embosser 26 is designed to emboss the surface configuration or ornamentation onto the capstock side of the sheet of plastic. Further, the rolls 36 of the embosser 26 apply tension to the sheet of plastic to draw the sheet of plastic down to a particular dimension. The pre-form die 28 is located immediately downstream of the embosser 26. In the pre-form die 28, the sheet of plastic, while still in a hot, semi-viscous state is pre-formed into a rough version of its final siding profile.

After leaving the pre-form die 28, the sheet of plastic material, while still in a hot semi-viscous state, is directed through the calibrator 30. In the calibrator 30, the rough version of the siding profile is formed into its final shape. Vacuum drawing means are provided in the calibrator 30, to draw the plastic siding material against the walls of the calibrator and into its final siding shape.

After leaving the calibrator 30, the plastic siding material is drawn through the water bath 32. In the water bath 32, final lock, or dimensional control of the siding profile, is effected. The water bath is preferably maintained at a temperature of about 60° F.–100° F. and helps set up the siding in its predetermined, final profile. A pair of rubber rolls 38 draw the siding through the foregoing stages. Additional steps, such as punching drain or nail openings, may be added as required.

Finally, downstream from the rubber rolls 38, there is the cutoff mechanism 34. At the cutoff mechanism 34, the siding is cut to the appropriate lengths to form siding panels.

The foregoing post-forming features of a plastic siding extrusion system are known to those in the art, and should require no further discussion. Further information about post-forming techniques can be obtained from U.S. Pat. No. 4,649,008.

As discussed above, the present invention relates to the manner in which accent color patterns or streaks are formed in the plastic siding, and to control of the streaking and mixing of the pellet accent colors with the capstock as the capstock is coextruded with the substrate material. In the preferred system disclosed above, the accent color patterns are introduced into the capstock, since only the capstock forms the externally exposed portion of the siding.

When thermoplastic materials are heated, the thermoplastic begins to soften, its physical properties changing in various ways. The temperature at which a measurable softening of the thermoplastic occurs when heated is preferably measured by the vicat method and is referred to as the vicat softening point temperature. Analogous or related temperatures may be measured by other methods, resulting in other scales of temperature versus physical property, such as the deflection temperature or the melt flow index. The vicat method and scale, preferred by the present inventors, is specified by ASTM D-1525, from which the "vicat softening point temperature" referenced herein was obtained. The vicat softening point temperature indicates the softening temperature, when the resin begins to melt in response to increased temperature. The melt flow index is a measure of the viscosity of a resin when it has fully melted.

In the present invention, the pellets are formed by alloying ("fusing") various resins together with the appropriate pigments. In the present invention, poly-α-methylstyrene ("PMS"), which has a high vicat softening point temperature, and a low viscosity when molten, is fused with other resins, such as acrylics, having lower vicat softening point temperatures, to produce an alloy with a relatively high vicat softening point temperature and variable, controllable viscosity when melting or molten. The low vicat, high viscosity acrylics and the low vicat, low viscosity acrylics, when used in combination with the high vicat, low viscosity PMS according to the present invention, provide a substantial increase in controllability of the softening, melting, dispersion and mixing of colors in the siding panels produced according to the present invention. The resulting accent color pellet, according to the present invention, generally have a vicat softening point temperature between about 100° C. and about 160° C., preferably between about 110° C. and about 150° C., more preferably between about 120° C. and about 140° C. In addition to the resins, the alloyed accent color pellet of the present invention also may incorporate color producing materials such as pigments, e.g., titanium dioxide ($TiO_2$), and additives such as stabilizer materials. The blend of materials is fused together and formed into cylindrical pellets. The cylindrical pellets preferably measure about 0.05 inch to 0.25 inch in both diameter and height, more preferably from about 0.07 inch to about 0.13 inch. Most preferably, the pellets are generally cylindrical and have a diameter in the range from 0.093 inch to 0.105 inch, and a height of approximately 0.110 inch. The height to diameter ratio may be about 2:1, but may vary from about 1:1 to about 3:1, but many other variations would be expected to work. The pellets may then be fed from the chamber 21 into the extruder 20 at the rate of about 1–10% by weight of the total weight of the capstock and pellet mixture. The pellets can be fed to the extruder 20 in a continuous, intermittent, or pulsed fashion.

Capstock base materials generally have a vicat softening point temperature in the range from about 85° C. to about 100° C., and preferably about 94° C. The pellets have a vicat softening point temperature about 15° C. to 50° C. higher. than the vicat softening point temperature of the capstock base material. Moreover, the pellets produce a variable, controllable dispersion of the accent color pigment into the capstock, under the extrusion parameters for the capstock, due to the high melt flow index of PMS. The pellets are considerably larger than the powder-sized particles of the capstock base material (i.e., the pellets will have a much lower surface area per unit weight than the powder-sized particles of the capstock). The proportion of pellets to capstock base material may be varied, constant, intermittent, or otherwise selectably variable. All of these factors, but most importantly the high vicat softening point temperature of PMS, contributes to the new and unexpectedly greater degree of control made available with this invention. Thus, for capstock base material with a vicat softening point temperature of about 90° C., and designed to be heated to at least 150° C. in the extruder 20, the preferred color accent pellets are designed with a vicat softening point temperature from about 110° C. up to about 140° C.

With the present invention, by increasing the amount of PMS in the pellet formulation, the amount of accent color allowed to dissolve into the base material is reduced, thereby imparting little of the accent color into the base material when extruded at relatively lower temperatures. When extruded through the extrusion die 16, the accent color streaks with this formulation are stretched only, and only slightly disperse into the base material, giving a bolder, more robust wood-grain streaking. If the extruder is operated at a higher temperature, the PMS will more completely melt, but at a later point in the process, resulting in dispersion of the accent color only into the immediately adjacent capstock base material.

With the present invention, by using a lower proportion of PMS to the low vicat softening point temperature resin in the pellets, an increased, but still controllable, amount of the accent color may be allowed to disperse into the capstock base material, thereby imparting a slight color to the background, and softening the edges of the streaks. This effect is referred to as "soft streaking." Depending on the formulation, more color may be imparted to the background generally, or the color may be restricted more to the vicinity of the streaks. The level of color imparted to the background can be further controlled by adjusting the screw and barrel temperatures of the extruder within the normal range of temperatures appropriate for the base material. This level of control makes it possible to eliminate addition of a pigment to the capstock base material in many cases, and to soften the edges of the streaks without affecting the background in other cases.

With the present invention it is possible, due to the controllability of these pellets, to obtain hard streaking and simultaneously to use more than one color of accent color pellets in a single formulation. The multicolored streaks resulting from using mixed colors of pellets in the method of this invention may be referred to as "mottled." The mottled appearance is enabled by using more than one color of accent color pellets made with a higher proportion of PMS.

In the examples to follow, the resin materials used to form the pellets have the following melt flow indices and vicat softening point temperature characteristics (determined using applicants' method based on ASTM Test Method D-1238 for melt flow index, and ASTM D-1525 for vicat softening point temperature):

| DATA ON MATERIALS USED | | |
|---|---|---|
| Material | MELT FLOW INDEX (g/10 min) Applicants' Method | VICAT SOFTENING POINT °C. (°F.) ASTM D-1525 |
| DR101 | 12.7 | 96° C. (205° F.) |
| PMS | ≈18* | >171° C. (>340° F.)** |
| VS100 | ≈24* | 87° C. (189° F.) |
| KMAX T-260 | <1.0 | 151° C. (304° F.) |

*Used modified method as described below.
**The vicat softening point temperature of PMS exceeded the measurable range of applicants' test instrument.

The accent color pellets of the present invention contain from 10 to 30% PMS and from 30 to 50% acrylic resins by weight. Preferably, the accent color pellets of the present invention contain from 12 to 27% PMS and from 35 to 45% acrylic resins by weight. More preferably blends of resins for the accent color pellets of the present invention contain from 16 to 25% PMS, 28 to 36% impact-modified acrylic resin (such as DR-101), 0–8% acrylic molding resin (such as VS-100), and 30–45% pigment, all by weight. Where the product is to be plastic siding for outdoor use, the pigments are preferably suitable for outdoor exposure, and more preferably are inorganic compounds. Accent color pellets produced from such formulations typically have a vicat softening point temperature between 120° C. and 140° C., and a Melt Flow Index ranging from 5 to 15 under ASTM D-1238, using an internal condition. Applicants' internal condition, which is a variation of the ASTM method D-1238, is described as follows.

The melt flow index test method referenced above uses a standard melt flow index apparatus. Applicants' standard method begins by adding a sample of pellets to a barrel in the apparatus, heated to 265° C. with no weight applied. The sample of pellets is allowed to heat for a timed period of 120 seconds. Next, the timer is reset and a rod and a preheat weight of 2400 grams is added (for a total weight applied to the pellets of 2500 grams). A second timed period of 120 seconds is allowed to elapse. When that time has elapsed, the 2400 gram weight is replaced with a 4900 gram weight (for a total applied weight of 5000 grams). As the weight settles, it contacts a switch which initiates an automatic measurement of the amount of molten resin passing through an orifice in the measured amount of time. The melt flow index is calculated by dividing 600 by the elapsed time multiplied by the weight of resin passing through the orifice in the elapsed time. The result is expressed as grams per 10 minutes. Under these conditions, KMAX T-260 has a melt flow index of less than one, indicating how highly viscous it remains when molten.

Due to the very low viscosity of molten PMS, it is not possible to use this standard method to measure the melt flow index of PMS. Instead, an "internal condition," which is a modification of ASTM D-1238 is employed. In the modified method, the sample is preheated for 120 seconds at 265° C. with no weight applied. The 2400 gram weight is then added, and the automatic measurement is allowed to proceed for two minutes, and the "modified" melt flow index is determined from the measured values. Essentially, the modified method 1) skips the second preheat step of the standard method, and 2) substitutes the 2400 gram weight for the 4900 gram weight used in the measurement. Even under the more gentle conditions of the modified method, the melt flow index of PMS is quite high. Under these modified conditions, it is estimated that an impact-modified acrylic such as DR101 would have a melt flow index of between one and three, indicating how highly viscous it remains when molten, when compared to PMS.

EXAMPLES

Samples of a coextruded residential plastic siding were prepared using conventional powdered PVC as substrate and a conventional powdered PVC formulation as capstock base material. The capstock base material formulation employed was a typical formulation used for exterior applications containing 10% $TiO_2$ and minor amounts of acrylic impact modifier, stabilizer, wax and process aid along with minute amounts of pigment that was dry-blended into the compound in a high intensity mixer. The capstock base material has a typical PVC vicat softening temperature in the range of about 85° to 100° C., and preferably about 94° C.

EXAMPLE 1

Figure 2:
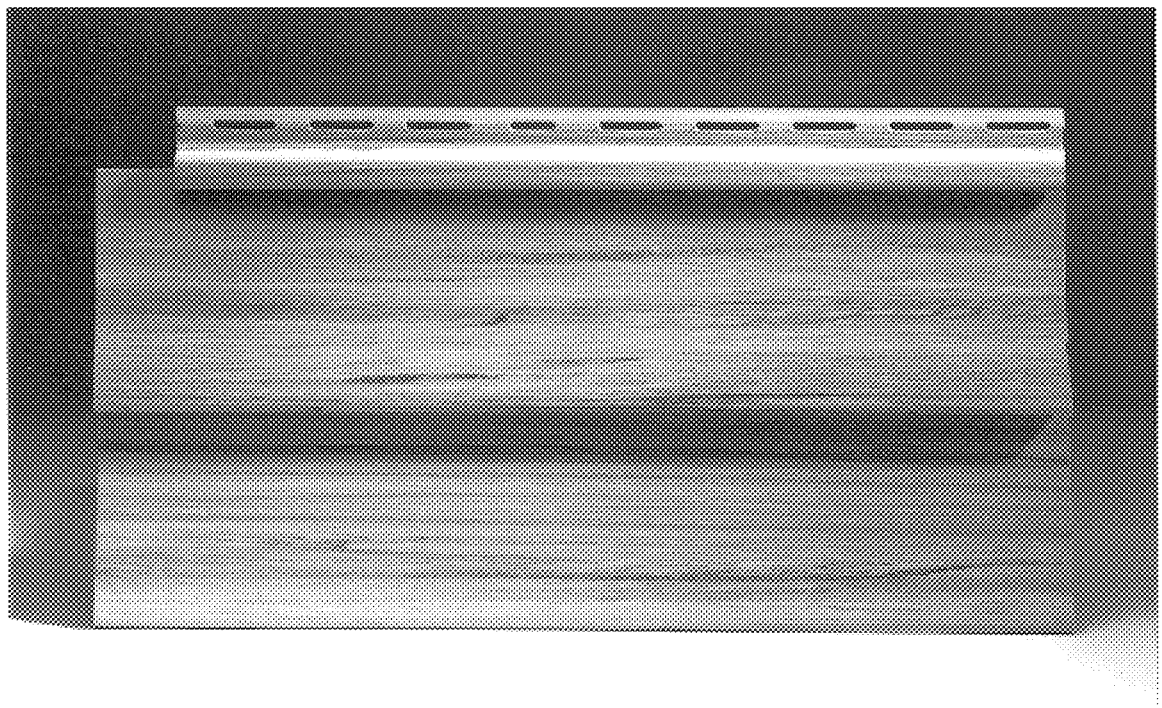
FIG. 2 is a photograph of the external appearance of the capstock layer of a plastic siding panel made in accordance with the present invention having a variegated, multi-colored wood-grain appearance, the pellets corresponding to the formula in Example 1.

Variegated, or mottled, accent color pellets were prepared in an internal fluxing mixer from the following materials:
15.0% poly-α-methylstyrene resin having a vicat softening point temperature above about 170° C.;
48.6% DR-101 acrylic having a vicat softening point temperature of about 96° C.;
9.4% #7370EA BUFF pigment;
10.7% #9741 BROWN pigment;
16.3% #9840 BLUE BLACK PLUS pigment.
The resulting pellets had a vicat softening point temperature of 123.6° C., and a melt flow index of 7.7. A photograph of the plastic siding material produced using the accent color pellets of this Example is shown in FIG. 2.

EXAMPLE 2

Figure 3:
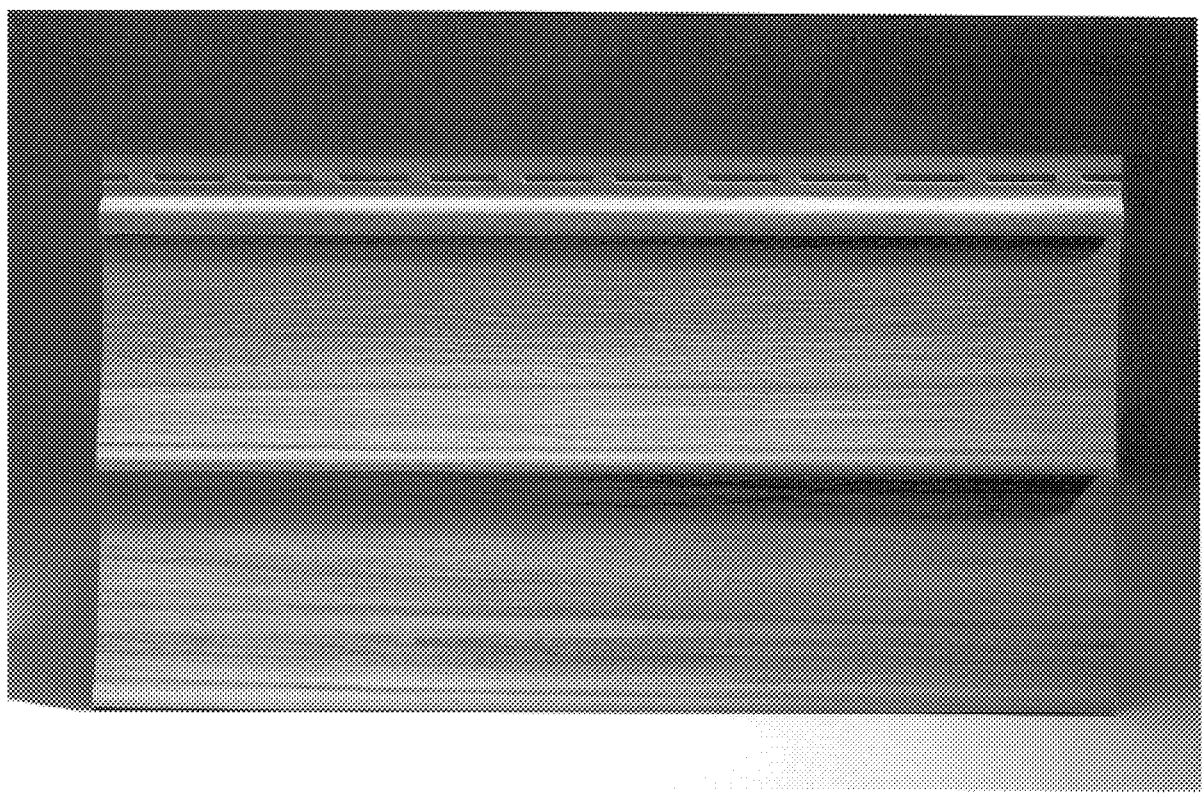
FIG. 3 is a photograph of the external appearance of the capstock layer of a plastic siding panel made in accordance with the present invention, using multiple colors of accent color pellets to produce a "variegated" wood-grain appearance, the pellets corresponding to the formula in Example 2.

To produce a variegated siding panel, a mixture of differently colored accent color pellets was prepared. Each of the three different accent color pellets had been prepared according to the present invention, and contained only PMS as the high vicat softening point temperature resin. The following amounts of accent color pellets were used:
68.0% Stone pellets
16.0% Dark Brown pellets
16.0% Brick Red pellets
A photograph of the plastic siding material produced using the blend of pellets in this example is shown in FIG. 3.

EXAMPLE 3

Figure 4:
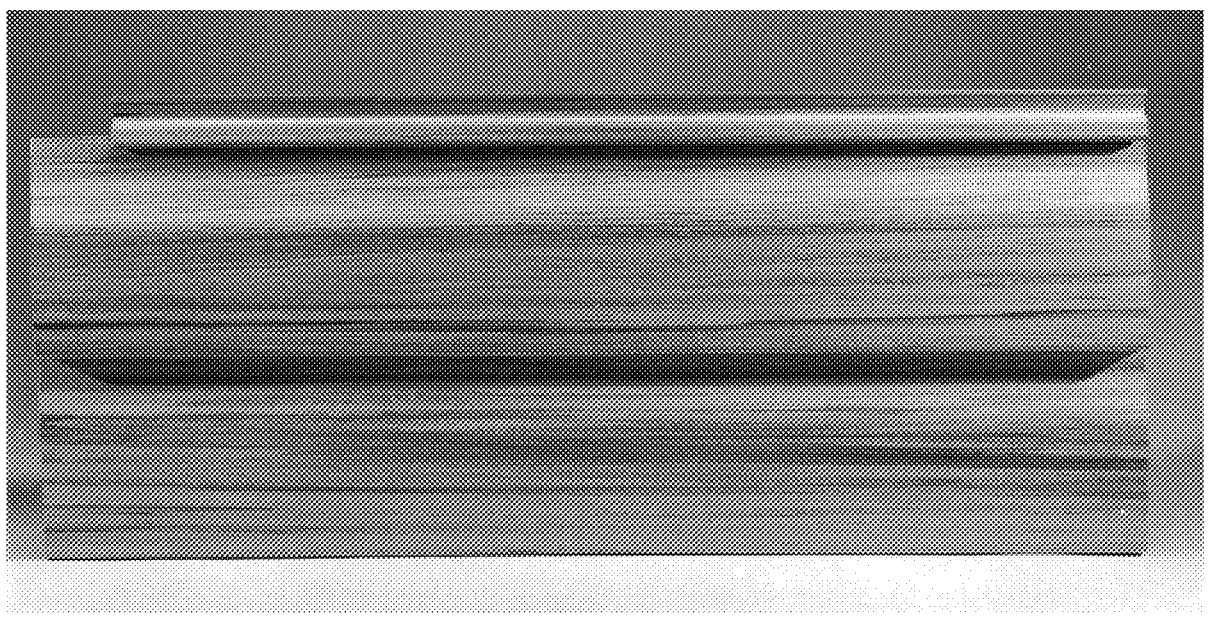
FIG. 4 is a photograph of the external appearance of the capstock layer of a plastic siding panel made in accordance with the present invention having a variegated, multi-colored wood-grain appearance, the pellets corresponding to the formula in Example 3.

Variegated, or mottled, accent color pellets were prepared in an internal fluxing mixer from the following materials:
20.0% poly-α-methylstyrene resin having a vicat softening point temperature above about 170° C.;
40.0% DR-101 impact-modified acrylic resin, having a vicat point softening temperature of about 96° C.;
9.3% #17370EA BUFF pigment;
1.8% #3955 CHR OX pigment;
18.6% #9741 BROWN pigment;
10.3% #7895 BLACK pigment.
The resulting pellets had a vicat softening point temperature of 128.0° C., and a melt flow index of 6.0. A photocopy of the plastic siding material produced using the accent color pellets of this Example is shown in FIG. 4.

EXAMPLE 4

Figure 5:
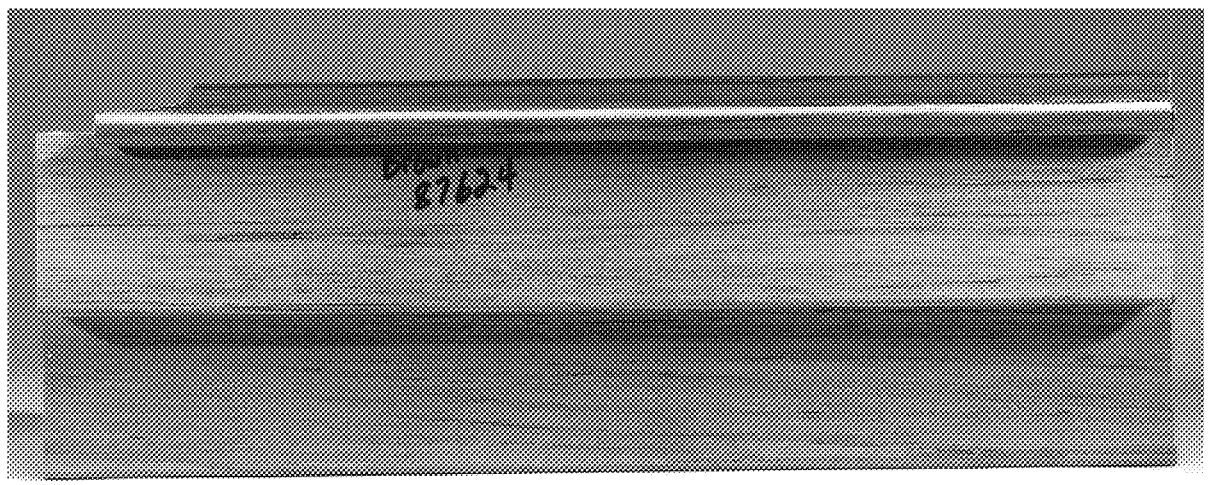
FIG. 5 is a photograph of the external appearance of the capstock layer of a plastic siding panel made in accordance with the present invention having a variegated, multi-colored wood-grain appearance, the pellets corresponding to the formula in Example 4.

Variegated, or mottled, accent color pellets were prepared in an internal fluxing mixer from the following materials:
25.0% poly-α-methylstyrene resin having a vicat softening point temperature above about 170° C.;
38.5% DR-101 impact-modified acrylic resin, having a vicat point softening temperature of about 96° C.;
8.5% #7370EA BUFF pigment;
1.6% #3955 CHR OX pigment;
17.0% #9741 BROWN pigment;
9.4% #9885EA BLACK pigment.
The resulting pellets had a vicat softening point temperature of 135.8° C., and a melt flow index of 6.2. A photocopy of the plastic siding material produced using the accent color pellets of this Example is shown in FIG. 5.

Each of the above mixtures was processed in the following manner. The mixture of resins and pigments were extruded and pelletized by chopping to the desired size in a pelletizer then classified using appropriate screens to obtain accent color pellets of about 0.05 inch diameter and about 0.15 inch height. The coextrusion was performed on a setup employing twin screw extruders for both the capstock mixture of color accent pellets and base material and the substrate. The accent color pellets were introduced at the throat of the capstock extruder in the ratio of about 2–5 parts accent color pellets to 100 parts of capstock base material. The barrel of the capstock extruder was set to a nominal temperature ranging from about 140° C. to about 190° C. The extrusion produced a flat sheet having a capstock with accent color streaks formed by streaking of the accent color pellets. The flat sheet was then post-formed and cooled by conventional methods to produce profile of exterior siding. The resultant siding had a surface with accented color that approximated the appearance of a natural wood-grain. The mixtures of resin and pigments were prepared and extruded into the pellets as described above. A photograph of the plastic siding obtained from the process for each of Examples 1–4 is shown in FIGS. 2–5, respectively.

Figure 6:
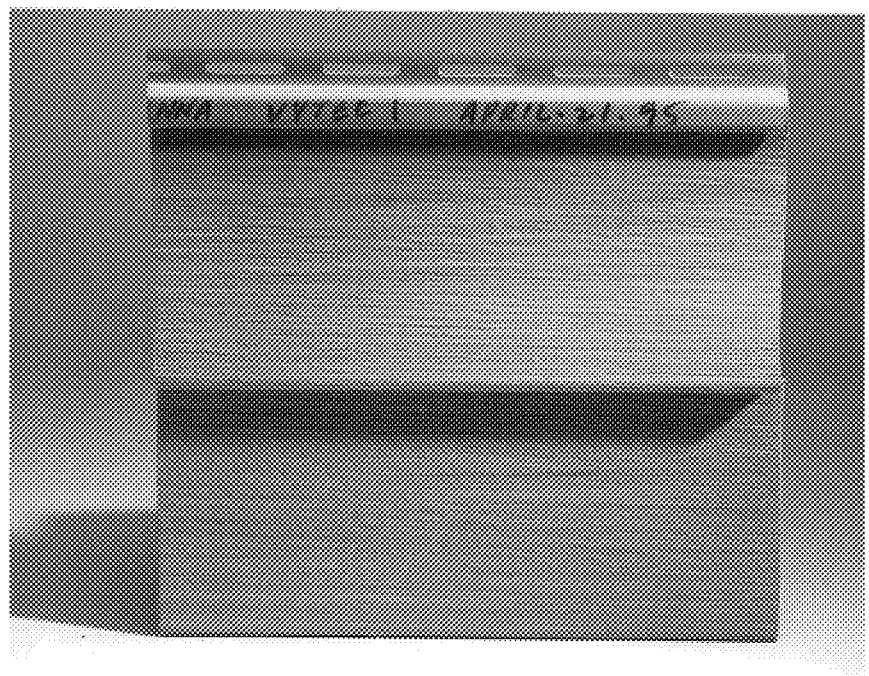
FIGS. 6–8 are photographs of the external appearance of the capstock layer of a three plastic siding panels made in accordance with the prior art, using only acrylics as taught by the Saloom patent.
Figure 7:
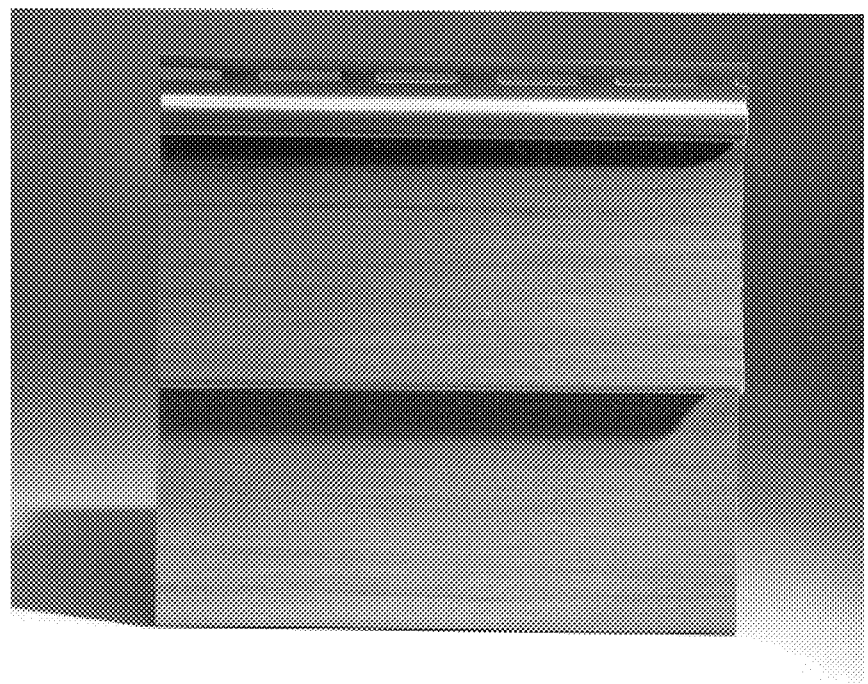
Figure 8:
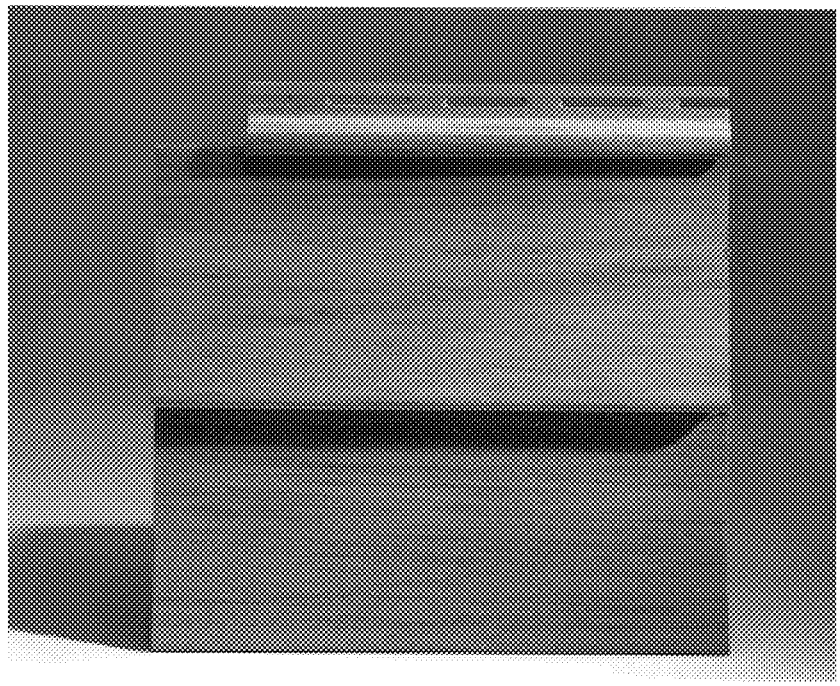

For comparison of the panels obtained with the present invention with those of the prior art, FIGS. 6, 7 and 8 are provided. The panels in FIGS. 6, 7 and 8 were made by prior art methods using only acrylics and/or polycarbonates and without the addition of poly-α-methylstyrene. As comparison of the photographs makes readily apparent, the use of poly-α-methylstyrene enables the user to obtain a much more strongly accented and realistic wood-grain appearance than was previously available. This difference is unexpectedly obtained from employing PMS rather than an acrylic as the only high vicat softening point temperature resin used in the accent color pellets.

Thus, for capstock base material with a vicat softening point temperature in the range of about 85° C. to 100° C., which is extruded at temperatures of about 167° C., it is preferable. to form pellets whose vicat softening point characteristics are such that the pellets will soften at temperatures between about 105° C. and about 155° C. With alloyed pellets having the vicat softening point characteristics described above, the accent color will be dispersed into a capstock extrudate layer in a restricted, newly controllable manner to produce accent color streaks in the capstock, thereby creating a simulated wood-grain effect in a plastic siding product.

Thus, according to the foregoing disclosure, the present invention provides a unique process, incorporating a novel, specially formed pellet to introduce controllable, selectable accent color patterns into extruded plastic articles. Based upon the foregoing disclosure, various pellet constructions for producing various types of simulated or streaked colored patterns in extruded products will become apparent to those of ordinary skill in the art.

What is claimed is:

1. A method of producing a capstock having a controllable and realistic wood-grain appearance, the capstock with at least one accent color, the method comprising the steps of:
   a) introducing into an extruder a capstock base material and accent color pellets, said capstock base material having a vicat softening temperature, said accent color pellets (i) having a higher vicat softening temperature than said capstock base material, and (ii) comprising poly-α-methylstyrene having a high vicat softening temperature and a melt flow index of greater than or equal to 1.0 gram per 10 minutes, and at least one additional resin having a substantially lower vicat softening temperature than the poly-α-methlstyrene; and
   b) extruding said capstock base material and said accent color pellets through an extrusion die to form a capstock under processing temperatures whereby the accent color pellets cause delayed introduction and controlled dispersion of the accent color into the capstock base material.

2. The method of claim 1, wherein the step of introducing said accent color pellets includes controlling the dispersion of said accent color according to the relative quantities of said poly-α-methylstyrene and said lower vicat softening temperature resin.

3. The method of claim 2, wherein said pellets are introduced into said extruder in an amount of about 1% to about 10% by weight of total material introduced into said extruder.

4. The method of claim 1, wherein said pellets have a vicat softening temperature that is about 15° C. to about 50° C. higher than the vicat softening temperature of the capstock base material.

5. The method of claim 4, wherein said pellets have a vicat softening temperature that is about 20° C. to about 40° C. higher than the vicat softening temperature of the capstock base material.

6. The method of claim 1, wherein said pellets have a vicat softening temperature of about 100° C. and about 160° C.

7. The method of claim 6, wherein said pellets have a vicat softening temperature of about 110° C. to about 150° C.

8. The method of claim 7, wherein said pellets have a vicat softening temperature of about 120° C. to about 140° C.

9. The method of claim 1, wherein the additional resin is an acrylic.

10. The method of claim 1, wherein the capstock base material comprises polyvinyl chloride.

11. The method of claim 1, further comprising the step of introducing into said extrusion die a substrate producing material, and co-extruding said substrate producing material with said capstock base material and said accent color producing material to produce a plastic article.

12. A method of producing a capstock having a controllable and realistic wood-grain appearance, the capstock with at least one accent color, the method comprising the steps of:
   a) introducing into an extruder a capstock base material and accent color pellets, said capstock base material having a vicat softening temperature, said accent color pellets having a vicat softening temperature that is about 15° C. to about 50° C. higher than the vicat softening temperature of said base material, said accent color pellets comprising (i) about 10% to about 30% by weight poly-α-methylstyrene, (ii) about 30% to about 50% by weight of at least one additional resin having a substantially lower vicat softening temperature than the poly-α-methylstyrene, and (iii) about 30% to about 45% by weight of a color pigment; and
   b) extruding said capstock base material and said accent color pellets through an extrusion die to form a capstock under processing temperatures whereby the accent color pellets cause delayed introduction and controlled dispersion of the accent color into the capstock base material.

13. The method of claim 12, wherein the poly-α-methylstyrene has a vicat softening temperature greater than about 170° C.

14. The method of claim 12, wherein the pellets comprise about 12% to about 27% by weight poly-α-methylstyrene and about 35% to about 45% by weight of the additional resin.

15. The method of claim 12, wherein the pellet comprises about 16% to about 25% by weight poly-α-methylstyrene and about 28% to about 44% of the additional resin.

16. The method of claim 12, wherein the capstock base material contains no added color pigment material, and the accent color pellets provide a background color and at least one accent color to the capstock.

17. The method of claim 12, wherein the additional resin is an acrylic.

18. The method of claim 12, wherein the poly-α-methylstyrene has a vicat softening temperature greater than about 151° C.

19. The method of claim 12, where the capstock base material comprises polyvinyl chloride.

20. The method of claim 12, further comprising the step of introducing into said extrusion die a substrate producing material, and co-extruding said substrate producing material with said capstock base material and said accent color producing material to produce a plastic article.

* * * * *